United States Patent [19]

Debize et al.

[11] Patent Number: 5,014,187
[45] Date of Patent: May 7, 1991

[54] ADAPTING DEVICE FOR ACCOMMODATING DIFFERENT MEMORY AND BUS FORMATS

[75] Inventors: Jean-Claude Debize, Nice; Yves Hartmann, Vence; Pierre Huon, St. Laurent Du Var; Michel Peyronnenc, St. Jeannet, all of France

[73] Assignee: International Business Machines Corp., Armonk, N.Y.

[21] Appl. No.: 193,867

[22] Filed: May 13, 1988

[30] Foreign Application Priority Data

Aug. 20, 1987 [EP] European Pat. Off. .......... 8748008.9

[51] Int. Cl.⁵ .............................................. G06F 12/00
[52] U.S. Cl. ..................... 364/200; 364/252.3; 364/252.6; 364/239; 364/239.3
[58] Field of Search ... 364/200 MS File, 900 MS File

[56] References Cited

U.S. PATENT DOCUMENTS

| | | | |
|---|---|---|---|
| 3,916,388 | 10/1975 | Shimp et al. | 364/200 |
| 4,131,940 | 12/1978 | Moyer | 364/200 |
| 4,631,671 | 12/1986 | Kawashita . | |
| 4,654,781 | 3/1987 | Schwartz et al. | 364/200 |

FOREIGN PATENT DOCUMENTS 206083 12/1986 European Pat. Off. .

OTHER PUBLICATIONS

IBM Technical Disclosure Bulletin, vol. 29, No. 2, Jul. 1986, pp. 864–868, Armonk, N.Y., U.S.: "Hardware-Assisted Byte Alignment for High-Speed Digital Communications Processors", FIGS. 1–5; p. 865, Lines 3–7; p. 866, Lines 5–12, Lines 5–12, p. 867, Lines 1–7.

Primary Examiner—Eddie P. Chan
Attorney, Agent, or Firm—Edward H. Duffield

[57] ABSTRACT

Disclosed is a memory access control device for a memory organized in $2^n$ byte words and having the capability of addressing each byte in a word under control of byte select signals (BS), through an m-byte wide bus 22, with $2^n/m$ being an integer k, to write or read data byte bursts comprising a variable count of bytes. For writing, k sets of m bytes received from bus 22 are stored into $2^n$ registers 40 during each bus period T; they are then transferred into buffer 30 which comprises successive location of $2^n$ bytes positions, through an alignment and control logic 42, which causes the buffer to be written in such a way that it maps the data arrangement in memory. This depends upon the least significant bits of the memory starting address determining the byte location within the memory words. Once the complete data burst is written into the buffer, the buffer content is transferred to the memory.

10 Claims, 9 Drawing Sheets

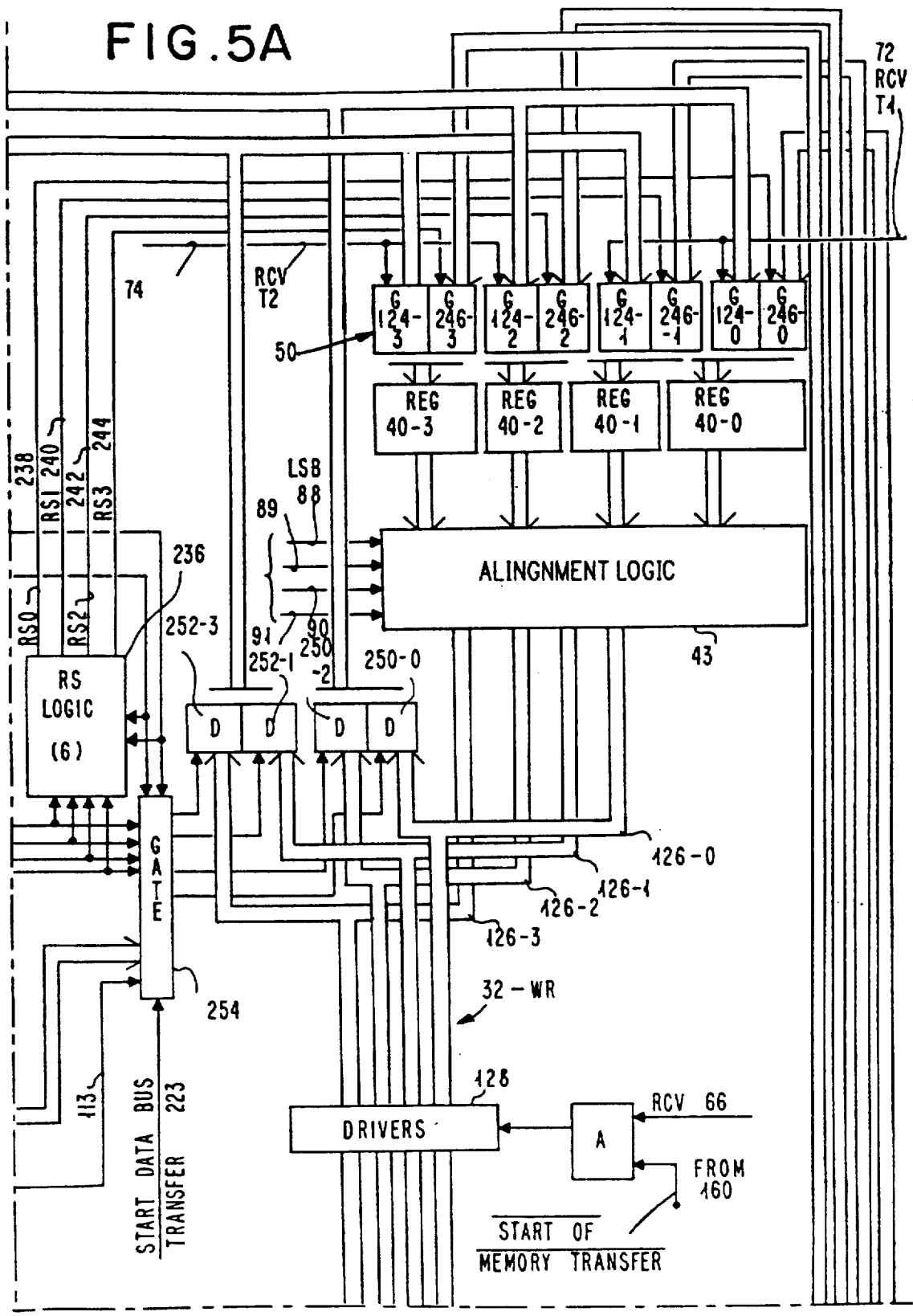

ADAPTING DEVICE FOR ACCOMMODATING DIFFERENT MEMORY AND BUS FORMATS

FIELD OF THE INVENTION

This invention relates to a device which allows the information to be received from or sent to an input/output device in an information handling system through an m-byte wide bus, to be read or written from a memory organized in $2^n$-byte words, with $2^n$ being higher than m.

BACKGROUND OF THE INVENTION

In the telecommunication world, communication is the key word. This is true not only for communication controllers, but also for computing systems, where components are embedded in a memory hierarchy, with each level in the hierarchy consisting of modules of larger capacity, slower access time and cheaper cost per bit.

Today, large and very large scale integration allows the manufacturing of fast random access memories which can conveniently used for the lower level of the hierarchy. However, optimization of the access to primary memory i.e. the main memory is still desirable. There is a considerable gap between the access times between the various levels of the hierarchy.

There are two major considerations for the treatment of input-output I/O device operations. First, the speed factor relates to the fact that the faster I/O devices are at least three orders of magnitude slower than the main storage. When the I/O device is fast and when the information block to transfer is several words long, an approach based on a buffering concept can be used. The I/O device requests an information transfer by specifying the memory address and the block length.

Second, the data format factor relates to the fact that because of the variety of the I/O devices and memory organizations, a logical interface must be inserted to adapt the different data structures of the I/O devices and of the memory.

To improve their intrinsic failure rate and thus the service cost, the memories are provided with an Error Correcting Code (ECC) capability. The number of ECC bits needed to reach a given detection/correction level is roughly a logarithmic function of the numbers of bits which are processed.

For example, to achieve a single error correction and a double error detection, six ECC bits are needed for two data bytes, seven ECC bits are needed for four data bytes and eight ECC bits are needed for eight data bytes. Hence it is more economical to organize the main memory in words of several bytes width, preferably matching the width of the processor data path, in order to save ECC bits. All mid-size to large size computers have a main storage with a width of m bytes. Now, a conventional value for m is 4 or 8. However, the information burst received from or to be sent to an I/O device does not generally start on a word boundary and this leads to a great performance degradation because for each I/O write operation, the memory controller must:

read the target word in memory,
check the ECC bits and correct the error if any,
merge the I/O data in the word,
compute the new ECC bits,
write the new data and new ECC bits in memory.

This sequence, which is called a "Read Modify Write", impairs the performance of the memory.

Another problem results from the fact that the I/O device format width does not generally match the memory width.

All these problems are generally solved by putting the burden on the I/O device. This device usually must have its own buffer providing data which matches the memory width. A further burden is put on the software which must cause all the I/O data transfers to start at an memory word boundary. Otherwise the Read Modify Write performance penalty is to be paid.

OBJECTS OF THE INVENTION

An object of the present invention is to provide an improved memory access control device which comprises a memory format adapter allowing high performance data transmission between peripheral I/O devices and a processor memory when the data carrier between the I/O devices is a m-byte wide data bus and the memory is organized in $2^n$ byte wide words, with $2^n$ higher than m and $2^n/m$ being equal to an integer k.

Another object of the invention is to provide a memory format adapter which improves the I/O device response time.

Another object of the invention is to provide such a memory format adapter which allows to take full advantage of the page mode of operation of dynamic random access memories.

Another object of the invention is to provide an improved memory format adapter which is transparent to the system software and to the I/O devices.

BRIEF SUMMARY OF THE INVENTION

The invention is memory access control device to be used to access a memory organized in $2^n$ byte words and having the capability of addressing each byte in a word under control of byte select signals (BS), through an m-byte wide bus, with $2^n/m$ being an integer k, to write data byte bursts comprising a variable count of bytes. It comprises:

clocking means which provide k non-overlapping pulse streams (T1, T2) having the same period T, memory format adapting means comprising:
- $2^n$ gating means (124) making up k sets of gating means, each set being responsive to one of the k non-overlapping pulse streams, each gating means of each set being connected so as to receive a data byte from the data bus to provide it on its output when activated by the pulse stream.
- $2^n$ register means (40), each register means being connected to the output of a gating means in such a way that at the end of a T period, $2^n$ bytes are stored in the register means,
- buffering means (30) comprising successive locations of $2^n$ positions, each position being able to store one byte under control of a write select signal,
- alignment and control means (42) which are active for a memory write operation and are responsive to the values of the least significant bits of the starting memory address which determine the byte location within the memory words, to the byte count and to the non overlapping pulse streams to selectively activate the write select signals relative to each buffer byte position and to write the data register contents in the selected positions of successive buffer locations in such a way that the buffer content maps the arrangement of the data burst which is to be written into the memory, and memory writing control means (192,168) which are active when the complete data burst has been written into the buffering means to selectively activate the byte select signals (BS) as a function of the least significant bits of the starting memory address so as to transfer the buffer content to the memory from the byte location in the first word defined by the starting memory address.

In addition, the memory format adapting means comprises memory reading control means for sending a data byte burst stored in the memory from a starting memory address to the data bus. This memory reading control means comprises:

buffer writing means (190,216,148) which are active to cause the data byte burst read from the memory to be written into the successive locations of the data buffering means in such a way that the data buffer content maps the content of the memory portion where the data burst was stored, buffer reading means (148,220) which are active when a complete burst has been written into the buffering means to read each buffer location, to provide the bytes read from the buffering means on buffer output buses (234 0-3)

register selection means (236) which are responsive to the values of the least significant bits of the memory starting address which determine the byte location within the memory words, to the byte count and to the non overlapping pulse streams to generate register select signals (RS), gating means (246) which are responsive to the register select signals to provide the bytes from the buffer output buses to selected ones of the registers means, and data bus control means (43.250.252) responsive to the least significant bit values and to the non overlapping pulse streams, to provide the register means content to the data bus sequentially, in the right order.

DETAILED DESCRIPTION OF THE INVENTION

Figure 1:
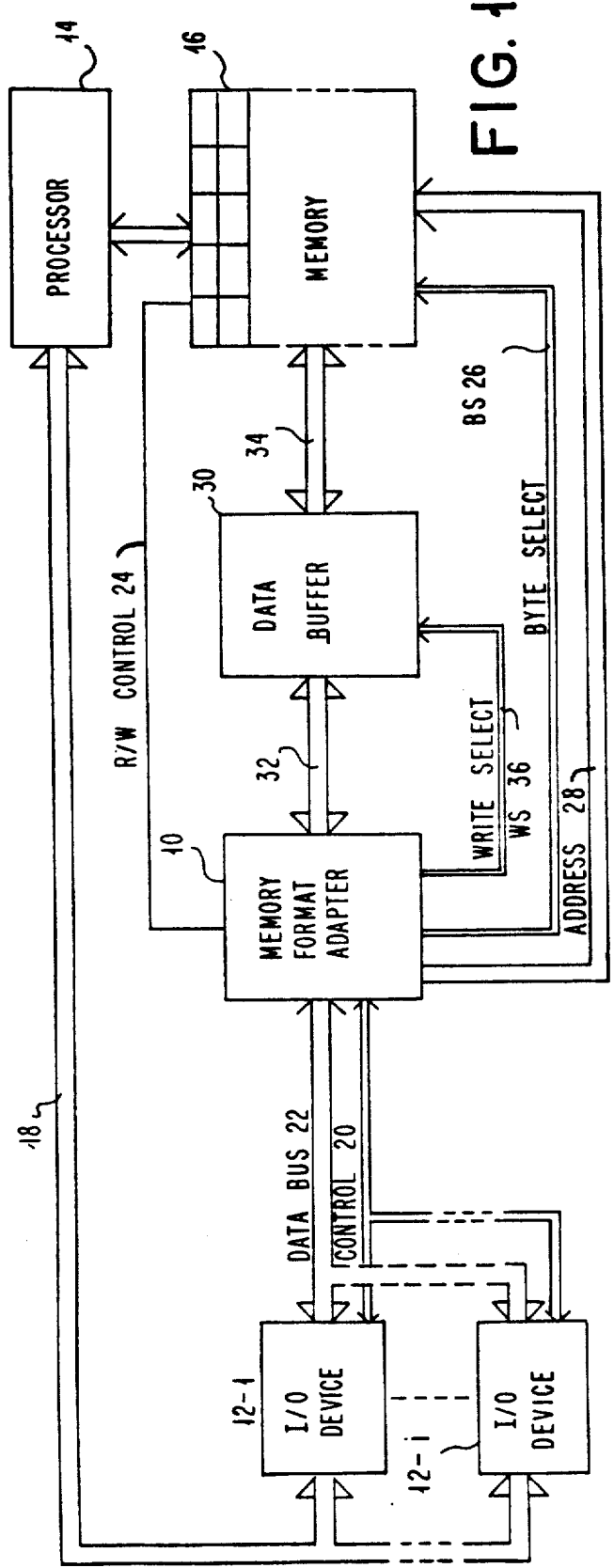
FIG. 1 shows the general arrangement of a system incorporating the memory format adapter according to the present invention.

As shown in FIG. 1, the memory format adapter 10 may be used in a data handling system comprising at least one input/output device 12 and a processor 14 with its memory 16. The links between these elements are only schematically represented, since they are not parts of the present invention and may differ according to the specific applications.

Two input/output adapters 12-1 and 12-i are shown in FIG 1.

The processor 14 initiates the transfers of data from or to a selected input/output device through processor bus 18 by sending the receive or transmit command and the starting address and burst length which is allocated in memory 16 to the selected input/output device.

It will not be described in detail how the input/output device is selected since this may be done by any of the known selection techniques such as the polling technique.

Once selected, the I/O device initializes the data transfers through control bus 20 and data bus 22 which connect the I/O devices to the memory format adapter 10. First, under control of tags on control bus 20 lines, the burst length i.e. byte count and the Starting Memory Address (SMA), at which the first burst byte must be written into or read from memory 16, is sent to memory format adapter 10 through data bus 22.

Then the input/output device 12 sends the data burst on data bus 22 for write operations or collects the data burst from memory 16 for read operations.

The control bus 20 is a set of physical lines which allow initialization and control of the data transfer.

According to a preferred embodiment of the present invention, the data bus 22 is a two-byte multiplexed bus which carries first: the parameters byte count and starting memory address (SMA), and then the data to be transferred between the input/output devices 12 and the memory format adapter 10.

Memory 14 is a several megabyte main storage which is word organized. It will be assumed that each address has the capability of storing four bytes.

According to the present invention, memory format adapter 10 is the logical interface between the input/output devices and the memory 16. It controls the whole transaction on both sides (input/output device and memory). To do so, it generates read/write control signals on line 24, byte select control signals on bus 26 and address signals on bus 28, as will be explained later on.

A four-byte data buffer 30 is connected to memory format adapter 10 through bus 32 to temporarily store an entire data burst before it is transmitted either to memory through bus 34 for a write operation, or to data bus 22 for a read operation. The buffer content reflects exactly the memory 16 portion where the data is read or written.

The data bytes are written into buffer 30 under control of write select signals on bus 36.

It is assumed that the input/output devices work in byte address mode in which the starting memory address at which the data burst must be written or read can be anywhere in the memory address range. Thus, this address may not be a word address.

The memory format adapter 10 according to the present invention, controls the data byte distribution between data bus 22 and memory 16 in both directions.

Figure 2:
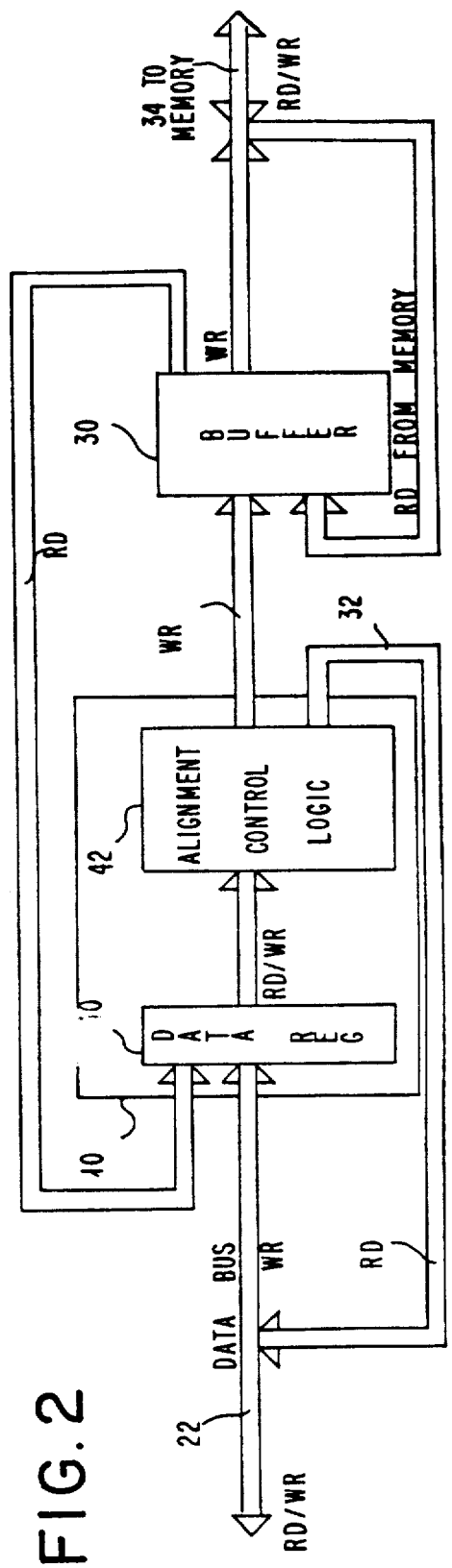
FIG. 2 shows the data flow between the memory format adapter and the buffer when the data are written into the memory and when they are read from the memory.

FIG. 2 shows schematically the data flows in adapter 10 which comprises data input registers 40 and alignment and control logic 42. A more detailed description of this adapter 10 will be made in reference to FIGS. 3 and 4.

The data alignment control logic circuit 42 allows adaptation of the byte organization of data bus 22 to the memory word organization in both read and write operations. It works as follows.

The two least significant bits (LSBs) of the starting memory address are decoded. Their decoding yields the byte position inside a word and thus the position where a data byte must be stored inside the data buffer 30.

During a write operation, the alignment is performed when transferring the data from the data registers 40 into the data buffer 30 through alignment and control logic 42.

During a read operation, read data are stored into buffer 30, the data read from buffer 30 are transferred to the data registers 40, and then sent to the alignment and control logic 42 which sends them to the data bus 22.

For the sake of simplicity, two distinct paths are represented in FIG. 2 for the write and read operations. These paths are referenced by WR and RD, respectively.

The write data alignment principle will now be described in reference to FIG. 3, assuming that the memory is organized in 4-byte words, and the input data bus 22 is two bytes wide.

Memory format adapter 10 comprises four input registers 40-0 to 40-3.

The two first bytes A and B of the transfer are stored into registers 40-0 and 40-1, then the third and fourth bytes are stored into registers 40-2 and 40-3. Depending upon the least significant bits (LSBs) of the starting memory address (SMA), the alignment and control logic 42 causes the received data bytes to be aligned into buffer 30, this allows direct transfer of the data buffer contents to the memory 16.

During the first cycle of the buffer write operation, one or two bytes are stored into the buffer 30 depending upon the LSB bits and the byte count. During the following cycle, following bytes must be loaded at the same address without altering those loaded at the previous cycle.

This is performed through the alignment logic 42 which controls the four write select lines 36, denotes as WS0, WS1, WS2, WS3. When activated these lines allows the contents of data register 40-0, 40-1, 40-2 and 40-3 to be transferred into byte 0, byte 1, byte 2 and byte 3 locations of buffer 30, respectively.

Figure 3:
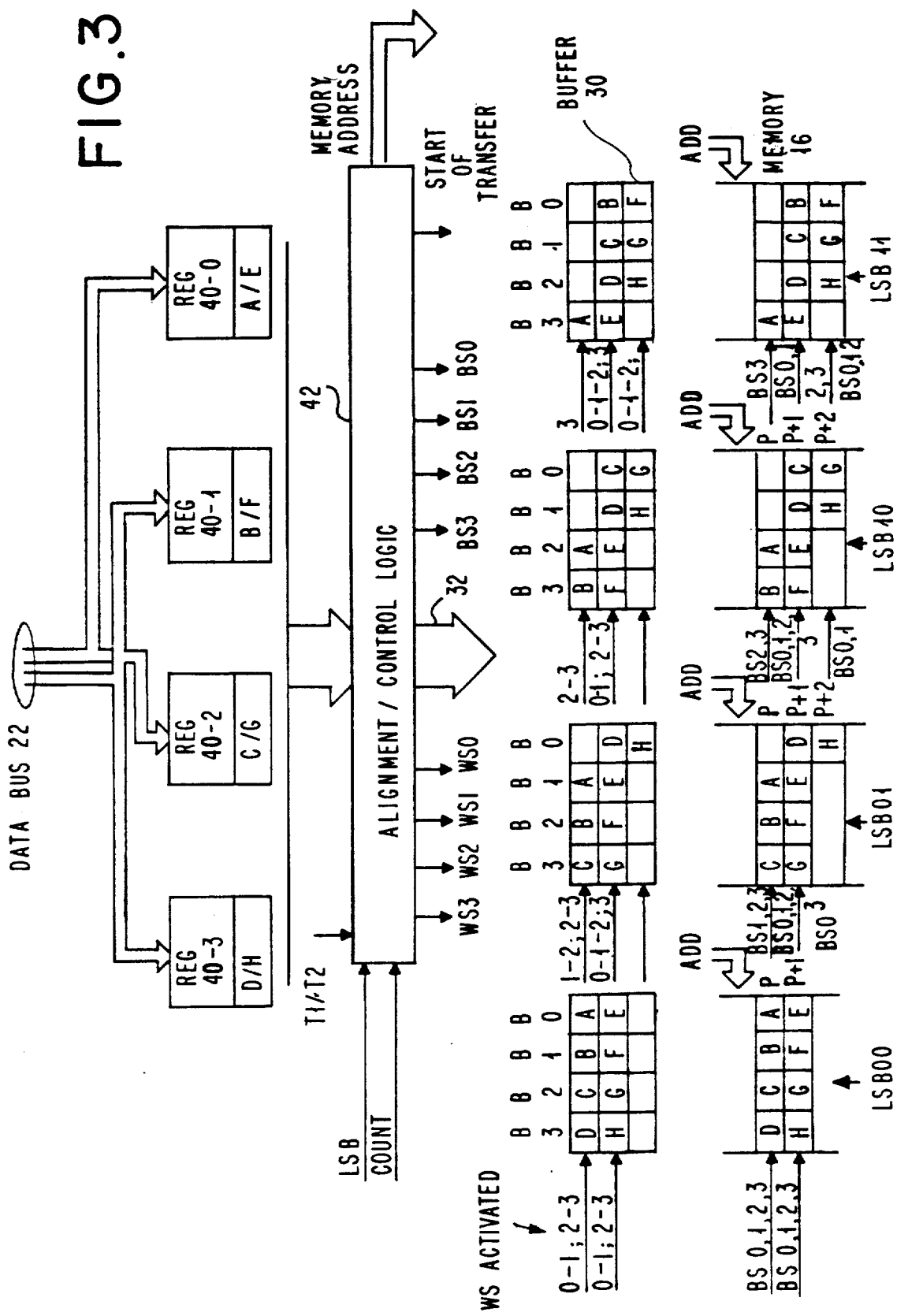
FIG. 3 shows how the received data bytes are arranged in the buffer to be written into the memory, depending upon the address LSB bit values.

FIG. 3 shows the arrangement of an 8-byte data burst into buffer 30, depending upon the LSB bit values. The 8 data bytes are names A, B . . . H.

For example, assuming that LSB bits are 00, the sequencing of the loading operations are the following:

1—The first data bytes A, B are sampled into data registers 40-0 and 40-1.

2—The first half-word i.e. data bytes A. B is loaded into the byte 0 and byte 1 positions of the first location of data buffer 30. Only write select lines WS0 and WS1 are activated while WS2 and WS3 are inactive.

The second half-word i.e. data bytes C. D is sampled into data registers 40-2 and 40-3.

3—The second data half-word (byte C and D) is loaded into the byte 2 and byte 3 positions of the first location of data buffer 30. Only WS2 and WS3 lines are activated.

The third half-word i.e. bytes E and F are sampled into the data registers 40-0 and 40-1.

4—The third half word (bytes E and F) is loaded into the second 4-byte location of data buffer 30. Only WS0 and WS2 are activated.

The last (fourth) half-word i.e. (bytes G and H) is sampled into data registers 40-2, 40-3.

5—The last half word (bytes G and H) is loaded into the second location of data buffer. Only WS2 and WS3 are activated.

6—The process ends since the byte count reaches zero.

In FIG. 3, the data buffer content is represented for the four different possible values of the LSB bits. On the left side of the four buffer configurations corresponding to LSB=00, LSB=01, LSB=11, it is indicated which write select lines WS are activated during the loading of the successive buffer locations. For example, the sequence 0-1; 2-3 indicates that during the first cycle lines WS0 and WS1 are activated and then during the second cycle lines WS2 and WS3 are activated.

As may be seen in FIG. 3, if LSB bits equal 01, lines WS1 and WS2 are first activated to load bytes A and B into byte 1 and byte 2 positions of the first buffer location, then WS3 is activated to load byte C into byte 3 position of the first location.

Then, WS0, WS1 and WS2 are activated to load the previously received byte D and new bytes E and F into byte 0, 1, 2 positions of the second location, then WS3 is activated to load byte G into byte 3 position of the second location.

Then, WS0 is activated to load last byte H into byte 0 position of third location.

In this case five write cycles are needed to load the eight bytes into buffer 30 instead of four in the first case where LSB=00

It may be seen in FIG. 3, that four write cycles are also needed if LSB=10.

In the last case, if LSB=11, four write cycles are needed.

During the first cycle, line WS3 is activated to load byte A in byte 3 position of the first location. Then lines WS0, WS1 and WS2 are activated to load bytes B, C and D into byte 0, 1, 2 positions of the second location. Line WS3 is activated to load byte E into byte 3 position of the second location. During the last cycle, lines WS0, WS1, WS2 are activated to load bytes F,G,H in the byte 0, 1, 2 positions of the third location.

Consequently, data alignment and control logic 42 comprises means for activating the write select lines when needed and means for providing the contents of input register 40-1 to 40-3 into the selected byte positions of buffer 30 depending upon the LSB bit values.

Thus, two values have to be calculated:

the data buffer loading number: in order to generate one more cycle when necessary with respect to the data bus transfer number.

the conditions which control the write select lines activations.

The number of data buffer loading depends upon whether the byte count is odd or even. When the count is even, it also depends whether it is a multiple of four or not.

The following logical equations are used:

The value of the byte count is expressed by a b-bit binary number. The b value depends upon the maximum burst length, it will be assumed (for this example) that it is equal to eight.

The bits of the byte count are X7,X6,X5,X4,X3,X2,X1,X0.

The byte count is even if the last significant bit X0 is at 0 and it is odd if bit X0 is at 1.

The byte count is a multiple of four if bit X1 is at 0 and X0 is at 0.

Thus the number of buffer write cycles is generally equal to the byte count divided by two, i.e. to the binary number comprising bits X7 to X1, except if the following condition is met:

$$X0 + X0.LSB01.X1 + X0.LSB11.X1 \quad (1)$$

If that condition is met the cycle number is equal to the binary number comprising bits X7 to X1 plus 1.

For example, if the byte count is equal to twelve, i.e. 00001100 and if the LSB bits of the starting memory address are 01, the condition is met and the cycle number is equal to 0000110+1, i.e. seven.

The selective activation of the write select lines depending upon the LSB bit values of the starting memory address is performed in a logic circuit working under the control of two basic time frames T1 and T2 which are generated in circuit 10.

The loading process always starts with T1 on and T2 off. The sequence T1,T2,T1... is used to determine the write select line status according to the following logical equations:

$$\begin{aligned} WS0 &= WS1 = T1.(LSB00 - LSB01) + T2.(LSB10 - LSB11) \\ &= WS2 = T1.(LSB01 - LSB10) + T2.(LSB00 - LSB11) \\ &= WS3 = T1.(LSB10 - LSB11) + T2.(LSB00 - LSB01) \end{aligned} \quad (3)$$

When assembled into the data buffer, the data burst is transmitted to memory 16 and written into the memory from the starting word address.

This is schematically represented in FIG. 3. where the memory content is shown for the four possible value of the LSB bits. It may be seen that the first and last memory transfer may be incomplete (less than four bytes). In that case, in order not to alter the other byte positions of the memory addressed word, the alignment logic controls the four byte select lines BS0 to BS3, comprising bus 26 of FIG. 1 according to the address LSB bits and burst length value.

Assuming the eight bit burst length and LSB bits equal to 11, the following operations are performed:

1—Transfer from data buffer address 0 to memory address P. Only byte 3 must be written, so only BS3 line is activated. This is indicated on the left side of memory.

2—Transfer from data buffer address 1 to memory address P+1. Four bytes are written, so BS0 to BS3 lines are activated.

3—Transfer from data buffer address 2 to memory address P+2. Three bytes are written, so BS0 to BS2 lines are activated. This is the last transfer.

The logical equations (3) which are used to activate the byte select BS lines are the following. Three values of the byte count BC are needed:

BC<2, BC<3 and BC<4.

Three phases of the memory transfer have to be considered.

Phase 1—First memory transfer:

BS0 = LSB00.F

BS1 = ((LSB00.BC<2)+(LSB10 - LSB11)).F

BS2 = ((LSB00.BC<3)+(LSB01.-BC<2)+LSB11).F

BS3 = ((LSB00.BC<4)+(LSB01.BC<3)+(LSB10.-BC<2)).F where F is equal to 1 during the first memory transfer.

Phase 2—Intermediate memory transfer

During this phase the four BS lines BS0 to BS3 are active. The equations are: $BS0 = BS1 = BS2 = BS3 = \bar{F}/$ where L is equal to 1 during the last transfer.

Phase 3—Last memory transfer:

BS0 always active since there is at least one byte.

BS1 = ((LSB00.X1.X0)+(LSB01.X1.X0)+LSB10.-X1.X0)+(LSB11.X1.X0)).L

BS2 = ((LSB00.X1+X0)+(LSB01.X1)+LSB10.(X-1+X0)+(LSB11.X1)).L

BS3 = ((LSB00.X0.X1)+(LSB01.X0.X1)+(LSB10.-X0.X1)+LSB11.X0.X1)).L where + means Exclusive OR.

The read data alignment principle will now be described in reference to FIG. 4. This figure shows the loading of the data read from memory 16 into data buffer 30 according to the four possible values of the LSB bits of the starting memory address and the burst length.

Gating circuit 50 allows the data bytes to be loaded into data registers 40-0 to 40-3 directly as they are read from data buffer 30 under control of register select signals RS0 to RS3. In FIG. 4, a burst comprising four bytes is represented for the sake of simplicity.

In the first case, with LSB=00, the data buffer address is read and the four bytes A, B, C, D are loaded into registers 40-0, 40-1,40-2 and 40-3, respectively. In that case, lines RS0 to RS3 are activated.

The alignment and control logic 42 sends the first half-word comprising bytes A and B on data bus 22 and then the second half-word comprising bytes C and D on data bus 22. The process stops as the burst length is four bytes.

The cases LSB=01 and LSB=10 will not be detailed. In the last case, with LSB=11, the sequence of operations is as follows:

1—Data buffer address 0 is read, and byte 3 location containing A is loaded into register 40-3 by activating RS3 line. Nothing is sent to data bus 22 since only one byte is available.

2—Data buffer address 1 is read and byte 0,1,2 locations containing bytes B,C,D, respectively, are loaded into data registers 40-0, 40-1 and 40-2 by activating lines RS0, RS1 and RS2 respectively.

Through the data alignment and control logic 42, the first half-word AB is sent to data bus 22.

3—Byte 3 of address 1 is read and loaded into register 40-3 while the second half-word is sent to data bus 22 through alignment logic 42. The process stops as the burst length is four bytes.

It is to be noticed that three data buffer to data register transfers were necessary to achieve the complete operation, whereas with LSB=00 only two transfers were necessary. Three logical equations are needed in read mode.

The number of transfers is equal to the byte count divided by two, i.e. to the binary number comprising the bits X7 to X1, except if the following equations are met:

$$1 - X0.LSB11 + X0.LSB11 \quad (4)$$

If this equation is met, the number of transfers is equal to the binary number comprising bits X7 to X1 plus 1.

$$2 - X0.LSB11 \quad (5)$$

If this equation is met, the number of transfers is equal to the binary number comprising bits X7 to X1+2.

For example, if the byte count is equal to five bytes, with LSB=11 the number of cycles is equal to four cycles, which are:

First cycle: read address 0 data buffer. Load A into register 40-3

Second cycle: read address 1 data buffer. Load BCD into registers 40-0,40-2,40-2.

Place AB on bytes 0 and 1 of data bus 22.

Third cycle: read address 1 data buffer. Load E into register 40-3.

Place CD on bytes 0 and 1 of data bus 22.

Fourth cycle: Place E on byte 0 of data bus 22.

In order to use the same alignment principle in read mode as in write mode, it is required to load the data which are read from buffer 30 into the data registers 40 in definite arrangement, as described previously.

The equations which determine the status of the register selection lines RS as a function of T1 and T2 signals and of the LSB bit values are the following:

$$RS0 = T1.LSB00 + T2.(LSB01 + LSB10 + LSB11)$$

$$RS1 = T1.(LSB00 + LSB01) + T2.(LSB10 + LSB11)$$

$$RS2 = T1.(LSB00 + LSB01 + LSB10) + T2.LSB11$$

$$RS3 = T1.(LSB00 + LSB01 + LSB10 + LSB11)$$

Figure 5B:
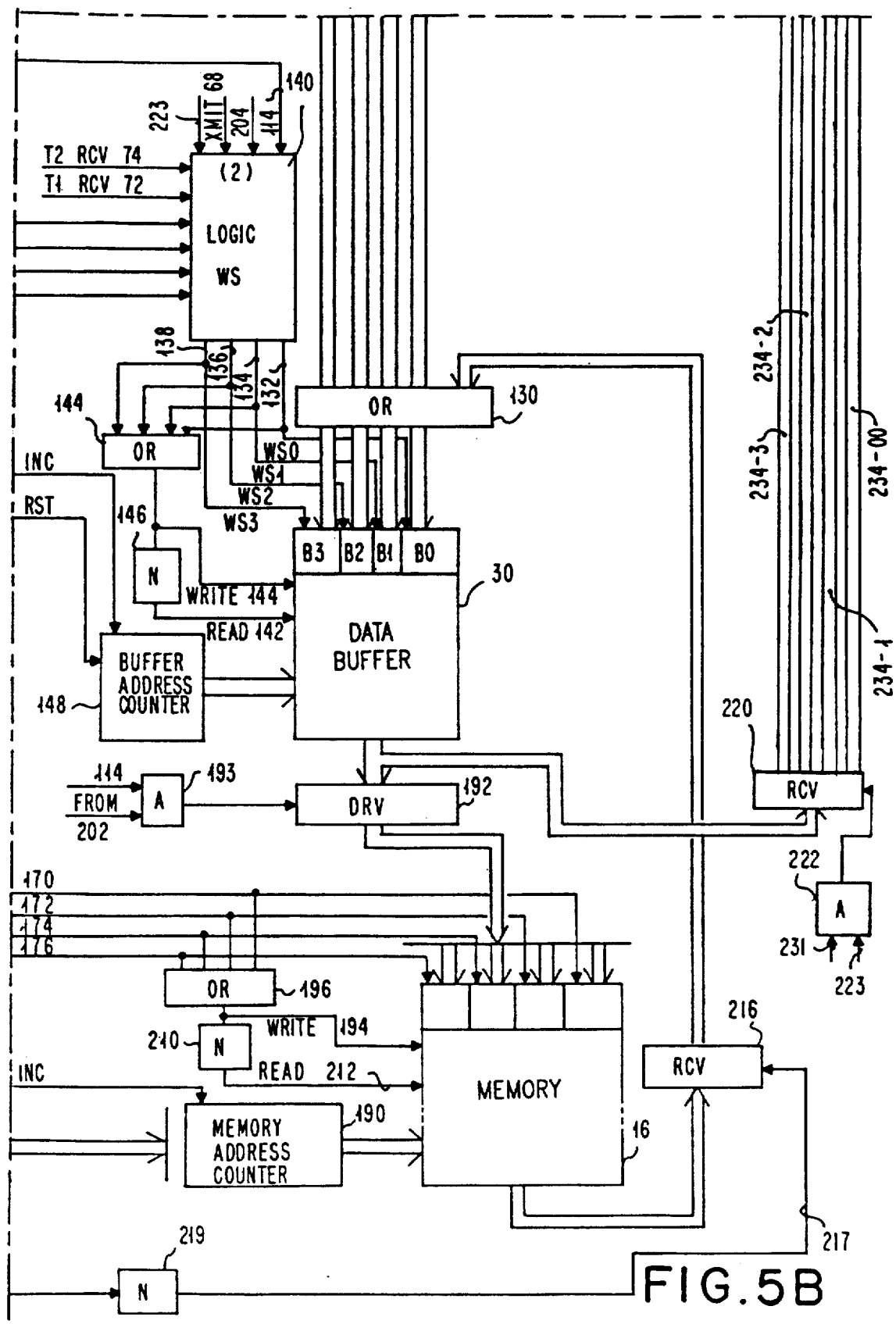
FIGS. 5-A to 5-D which have to be assembled as shown represent a detailed implementation of the memory format adapter according to the present invention.
Figure 5C:
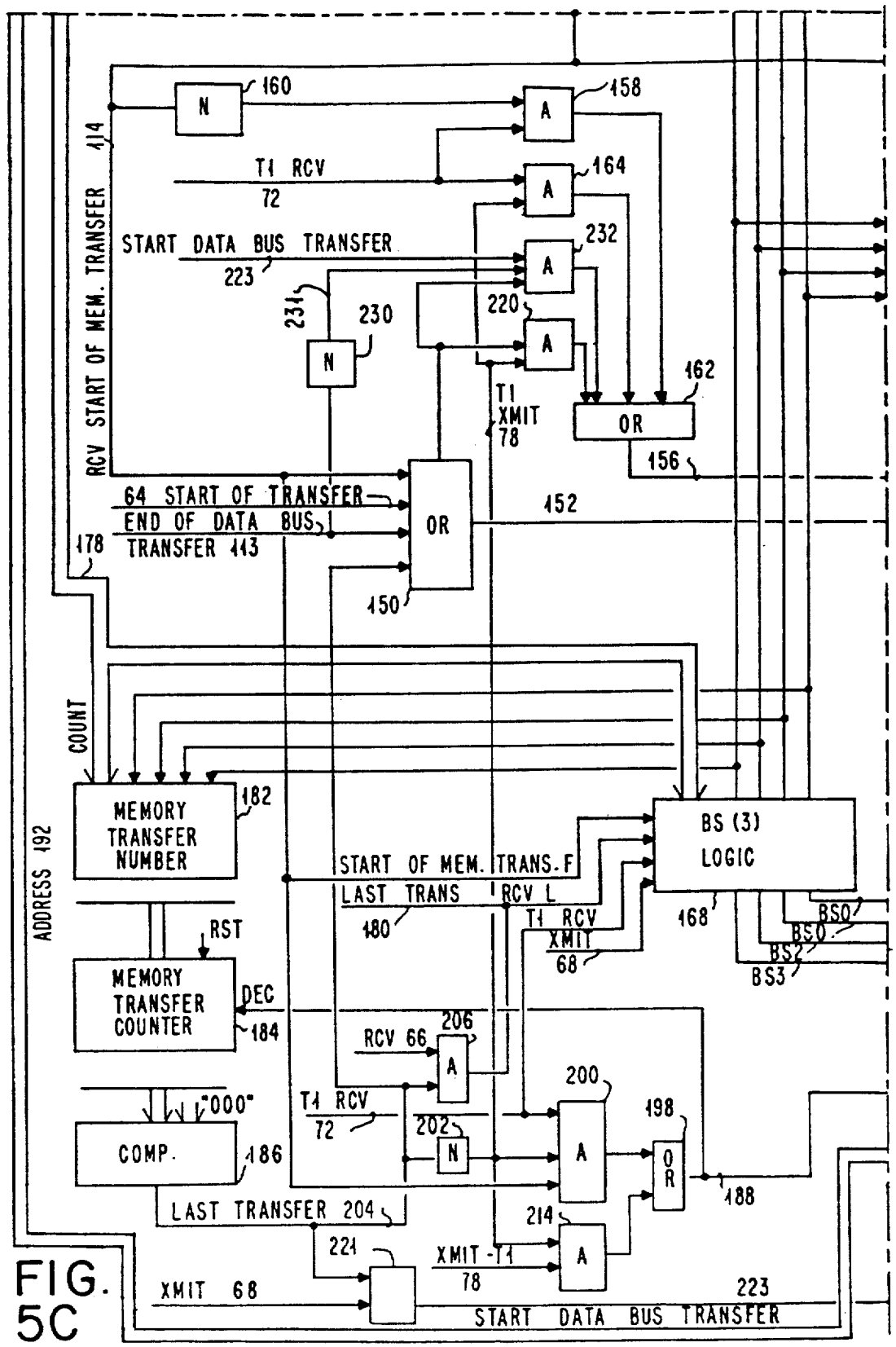
Figure 5D:
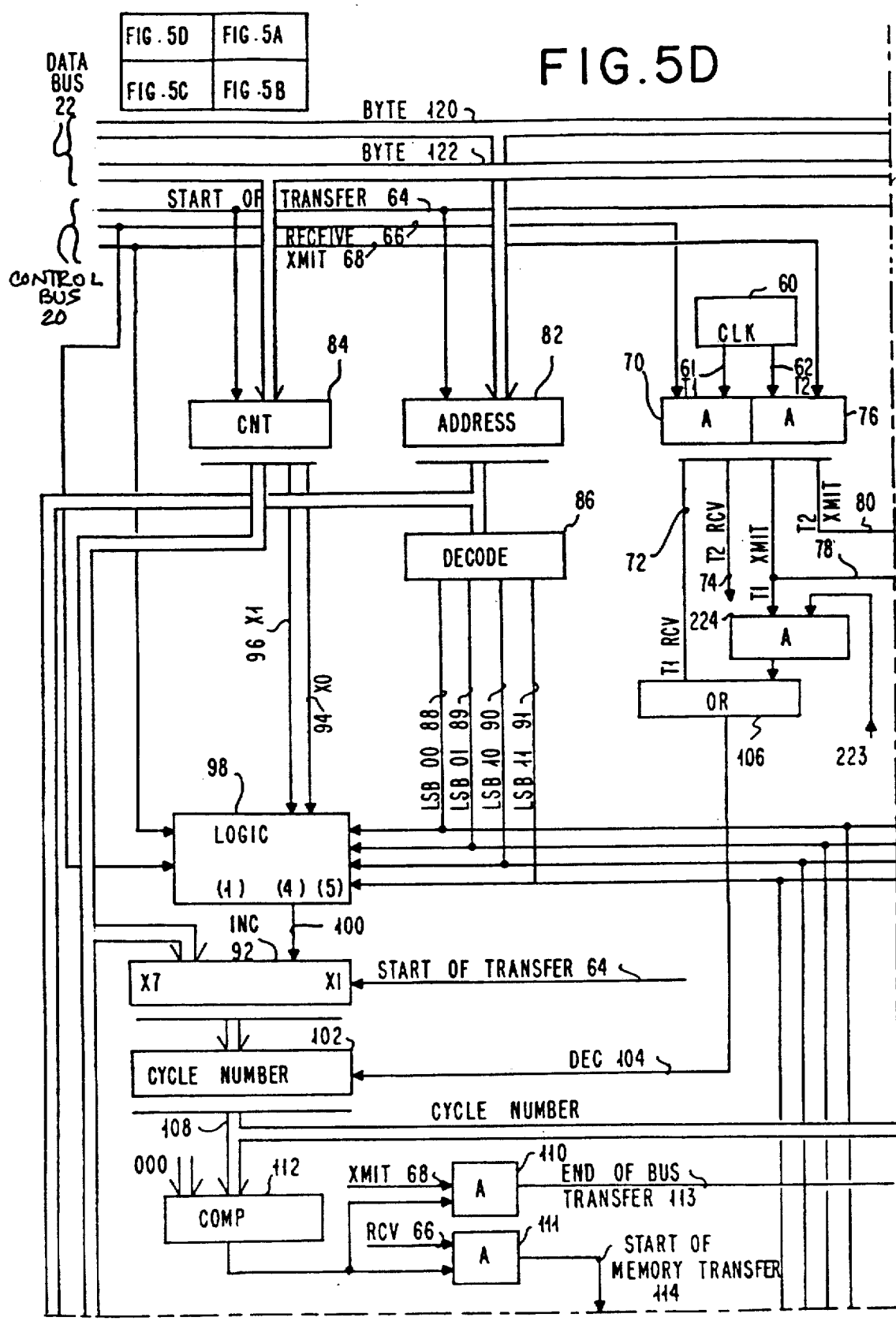

The detailed implementation of the memory format adapter 10 and of its attachment to the data buffer 30 and to memory 16 will now be described with reference to FIGS. 5A to 5D. In FIGS. 5A to 5B, all the logic circuits which allow the WS, BS and RS signals to be generated together with the aligment logic 43 comprise the alignement and control logic 42.

Clock 60 provides on its output lines 61 and 62, two non-overlapping pulse streams T1 and T2 so as to define the two time frames T1 and T2 during one clock period.

Memory format adapter 10 is responsive to the START OF TRANSFER signal on line 64 and to the RECEIVE and TRANSMIT signals on lines 66 and 68 of control bus 20.

In receive mode, i.e. when data are received from one I/O device to be written into memory 16, the active RECEIVE signal on line 66 conditions AND gate 70, which thus provides the T1 and T2 pulse streams on lines 72 and 74.

In transmit mode, i.e. when data are read from memory 16 to be sent to one I/O device, the active TRANSMIT signal on line 68 conditions AND gate 76 which thus provides the T1 and T2 pulse streams on lines 78 and 80.

The START OF TRANSFER command on line 64 causes the count and address bytes relative to the command to be loaded into registers 82 and 84.

Decode circuit 86 decodes the address bits and generates signals on its output lines 88, 89, 90, 91 which are active to indicate that the LSB bits of the address are 00, 01, 10 and 11 respectively. X7 to X1 bits of the count byte are provided to register 92 at the start of transfer.

LSB bit signals on lines 88 to 90, bits X0 and X1 of the count byte on lines 94 and 96 and RECEIVE and TRANSMIT signals on lines 66 and 68 are provided to logic 98 which generates incrementation signals on its output line 100 depending upon whether equations (1) page 13, (4) or (5) page 15, are met or not. This causes the content of register 92 to be incremented by 1 or 2, as the case may be, as explained before.

Thus register 92 contains an indication of the number of bus cycles which are needed to achieve the RECEIVE or TRANSMIT commands. This number is transferred into counter 102 where it is decremented by the T1 RECEIVE or T1 TRANSMIT signals on output line 104 of OR gate 106 during the data bus transfer period.

The content of counter 102 on bus 108 is provided to comparator 112. Comparator 112 compares the content of counter 102 with "000 . . . " and provides an active signal on its output line when an equality is detected.

The output signal from comparator 112 is provided to one input of AND gates 110 and 111. AND gate 110 is conditioned by the XMIT signal on line 68 and provides on its output line 113, the END OF BUS TRANSFER signal which is active when all the data bytes have been read from buffer 30 and sent to the data bus 22.

AND gate 111 is conditioned by the RCV signal from line 66 and provides on its output line 114, the RCV START OF MEMORY TRANSFER signal which is active when all the data bytes have been received from the bus and stored into buffer 30.

In receive mode, the received data bytes on BYTE 0 and BYTE 1 lines 120 and 122 of data bus are provided to the input registers 40 through gating circuit 50 in the following way.

Bytes 0 received on lines 120 are provided to gates 124-0 and 124-2 and bytes 1 received on lines 122 are provided to gates 124-1 and 124-3. Gates 124-0 and 124-2 are conditioned by the RECEIVE T1 pulse stream on line 72 and gates 124-1 and 124-3 are conditioned by the RECEIVE T2 pulse stream on line 74. Thus, during the T1 period, bytes 0 and 1 are loaded into registers 40-0 and 40-1 and during the T2 period, bytes 2 and 3 are loaded into registers 40-2 and 40-3.

The contents of registers 40-0 to 40-3 are provided to alignment logic circuit 43 which provides the register contents on selected output buses 126-0, 126-1, 126-2 and 126-3 depending upon the LSB bit values. The specific logic arrangement which may be used to performed this function will be described later in reference to FIG. 6.

In receive mode, the bytes on output busses 126-0 to 126-3 are provided by drivers 128 and OR circuit 130 to be written into buffer 30 under control of WRITE SELECT signals on lines WS0 to WS3 132, 134, 136 and 138. These signals are generated by logic circuit 140 which is responsive to LSB bit values on lines 88 to 91, to RECEIVE T1 and T2 signals on lines 72 and 74. Logic circuit 140 activates the WS0 to WS3 lines 132, 134, 136 and 138 according to equations (2), until the signal on line 114 becomes active.

When all the data bytes have been received, which is indicated by the RCV-START OF MEMORY TRANSFER signal on line 114, none of the lines 132, 134, 136 and 138 is activated and the reading of the buffer begins.

Read and write operations in buffer 30 are controlled by READ and WRITE signals on lines 142 and 144 which are generated from the signals on lines 132, 134, 136 and 138 through OR gate 144 and inverter 146.

In receive mode, the START OF TRANSFER signal on line 64 causes buffer address counter 148 to be reset to zero, through OR gate 150 which provides an active signal on line 152.

Then, until the START OF MEMORY TRANSFER signal on line 114 is active the buffer address counter is incremented at each RECEIVE T1 pulse on line 156. This is the function of AND gate 158 which is conditioned by the inverted START OF MEMORY TRANSFER signal from inverter 160 and provides the RECEIVE T1 signal to OR gate 162.

Thus, the received data bytes are written into successive addresses of buffer 30. The START OF MEMORY TRANSFER signal on line 114 is provided to OR circuit 150, so that when it becomes active, i.e. when bytes are stored into buffer 30, the RESET signal on line 152 causes the buffer address counter to be reset, and logic 140 causes the READ pulses to become active, so that buffer 30 is read to transfer the received data bytes to memory 16.

The buffer address counter 148 is incremented through the RECEIVE T1 pulse on line 72 which is provided by AND gate 164 which is conditioned until the LAST TRANSFER signal on line 204 becomes active and by OR gate 162

The transfer into memory 16 is controlled by BS logic 168, which generates the active signals on BS lines 170, 172, 174 and 176. This is done in accordance with the equations (3), and is thus responsive to the COUNT number, from bus 178, the LSB bit values on lines 88 to 91, the first transfer signal which is derived from the START OF TRANSFER signal on line 114 and from the RECEIVE T1 on line 72, and the last transfer signal on line 180.

LAST TRANSFER signal is generated from logic circuit 182, memory transfer counter 184 and comparator 186. Logic 182 calculates the memory transfer number which depends upon the count value on bus 178 and upon the LSB bit values on lines 88 to 91. The memory transfer number is provided to counter 184 which is decremented at each transfer through the signal on line 188.

The starting memory address received from register 82 through bus 192, is stored into memory address counter 190 which is incremented by the signals on line 188. During the period of transfer of the buffer content to memory 16, drivers 192 are activated by the output signal from AND gate 193, the inputs of which are connected to the RCV START OF MEMORY TRANSFER line 114 and to the output of inverter 202 which inverts the LAST TRANSFER signal on line 204.

Thus, the data bytes which are read from buffer 30 may be written into memory 16 under control of both the BS signals on lines 170, 172, 174 and 176 and of the WRITE control signal on line 194 at the output of OR gate 196; the WRITE signal is active as far as at least one of the BS lines 170, 172, 174 or 176 is active.

The signals on line 188 are provided by OR gate 198, AND gate 200 and inverter 202.

Comparator 186 provides an active signal on line 204 when the memory transfer counter is equal to zero, which is indicative of the last transfer.

AND gate 200 is conditioned by the RECEIVE START OF MEMORY TRANSFER signal on line 114 and by the inverted LAST TRANSFER signal from inverter 202 so as to provide to OR gate 198 the RECEIVE T1 pulses on line 188.

In receive mode, AND gate 206 is conditioned and provides the LAST TRANSFER signal from line 204 to input line 180 of logic 168 to be used as "L" in equations (3).

LAST TRANSFER signal on line 204 is provided to OR gate 150 so as to reset the buffer address counter 148 at the end of the memory transfer.

The transmit operations will now be described. As in receive mode, the starting memory address is stored into memory address counter 190 from bus 192. XMIT signal on line 68 is provided to BS logic 168 to deactivate the BS lines. Thus OR gate 196 provides a DOWN level signal to inverter 210 which generates an active READ control signal on line 212.

Circuit 182 calculates the memory transfer number which is provided to counter 184. The memory address counter 190 is incremented by T1 XMIT signal on line 78 provided by AND gate 214 and OR gate 198 to line 188 until the LAST TRANSFER SIGNAL becomes active. This is done by connecting the output of inverter 202 to one input of AND gate 214, the other input of which is connected to line 78.

When the transfer starts, buffer address counter 148 is reset and the data bytes which are read from the addressed memory locations are transferred by receivers 216 which are activated by the signal on line 217, and by OR gate 130 into successive locations of buffers 30. The signal on line 217 is active from the start of transfer until the last transfer from memory 16 to buffer 30 occurs. It is provided by inverter 219 which inverts the XMIT START OF TRANSFER signal on the output line 223 of AND gate 221, whose inputs are the LAST TRANSFER line 204 and the XMIT line 68.

The four WS lines 132, 134, 136 and 138 are activated so that the WRITE signal on line 194 is active. The buffer address counter 148 is incremented from 000 by the T1 XMIT pulses which are provided on line 156, by AND gate 220 conditioned by the signal at the output of inverter 202, i.e. until the LAST TRANSFER signal becomes active, and by OR gate 162

When the data byte burst is transferred from memory 16 to buffer 30, which is indicated by an active LAST TRANSFER signal on line 204, buffer address counter 148 is reset by means of OR gate 150, one input of which is connected to line 204.

At that time, WS logic 140 which is responsive to XMIT signal on line 68, to LAST TRANSFER signal on line 204 and to START DATA BUS TRANSFER signal on line 223, deactivates the WS lines 132, 134, 136 and 138 so that the READ control signal on line 142 is active.

The successive buffer locations are read, and the bytes 0, 1, 2, 3 of the read words are transferred by receiver 220 to gating circuit 50. Receiver 220 is activated by the output signal from AND gate 222 during the data bus transfer. The inputs of AND gate 222 are connected to the START DATA BUS TRANSFER line 223 and to the line 231 which carries the END OF DATA BUS TRANSFER signal.

The END OF DATA BUS TRANSFER signal on line 113 is inverted in inverter 230, the output line 231 of which is provided to AND gate 232. Thus, AND gate 232 is conditioned when the buffer 30 is read through the signals on lines 223 and 231 to provide the T1 XMIT pulses to line 156 through OR gate 162, so as to increment the buffer address counter 148 at each T1 pulse.

For each word read from the buffer, Byte 0 on bus 234-0 is provided by gating logic 50 to register 40-0, Byte 1 on bus 234-1 to register 40-1, Byte 2 on bus 234-2 to register 40-2 and byte 3 on bus 234-3 to register 40-3. This is done under control of logic 236 which generates the RS signals on lines 238, 240, 242, 244 from LSB bit values on lines 88 to 91 and from T1 and T2 XMIT signals on lines 78 and 80, according to equations (6).

Gating logic circuit 50 comprises AND gates 246-0, 246-1, 246-2 and 246-3 which are conditioned by RS0, RS1, RS2 and RS3 signals on lines 238, 240, 242, 244 to provide the bytes on buses 234-0, 234-1, 234-2 and 234-3 to registers 40-0, 40-1, 40-2 and 40-3, respectively.

The contents of these registers are provided to the alignment logic 43, to be provided to data lines 120 and 122 through drivers 250-0 and 250-2 and drivers 252-1 and 252-3.

Figure 4:
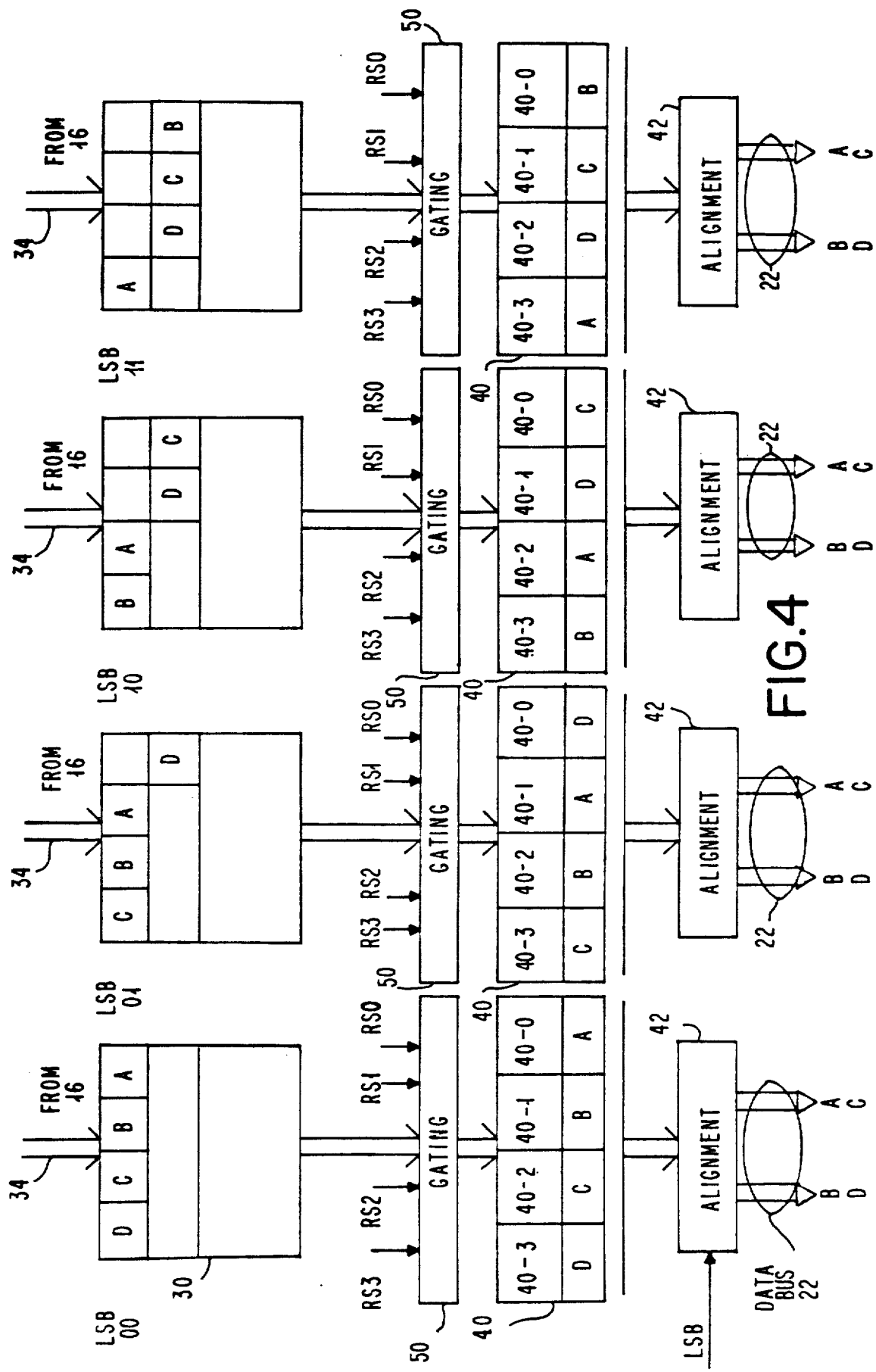
FIG. 4 shows how the data bytes read from the memory are arranged into the input data registers depending upon the address LSB bits values, to be sent in the correct sequence to the data bus through the alignment logic.

Drivers 250 and 252 are activated by gating logic 254 which is responsive to the cycle number from circuit 102 to the START OF TRANSFER signal on line 223, to the END OF BUS TRANSFER signal on line 113 and to the T1 and T2 XMIT signals on lines 78 and 80, to have the bytes read from buffer 30 transmitted in the correct order to the data lines 120 and 122 of data bus 22, as explained in reference to FIG. 4.

The cycle number counter 102 is decremented by the T1 XMIT pulses provided on line 104 by AND gate 224 conditioned by the START OF TRANSFER signal on line 223, and by the OR gate 106.

Figure 6:
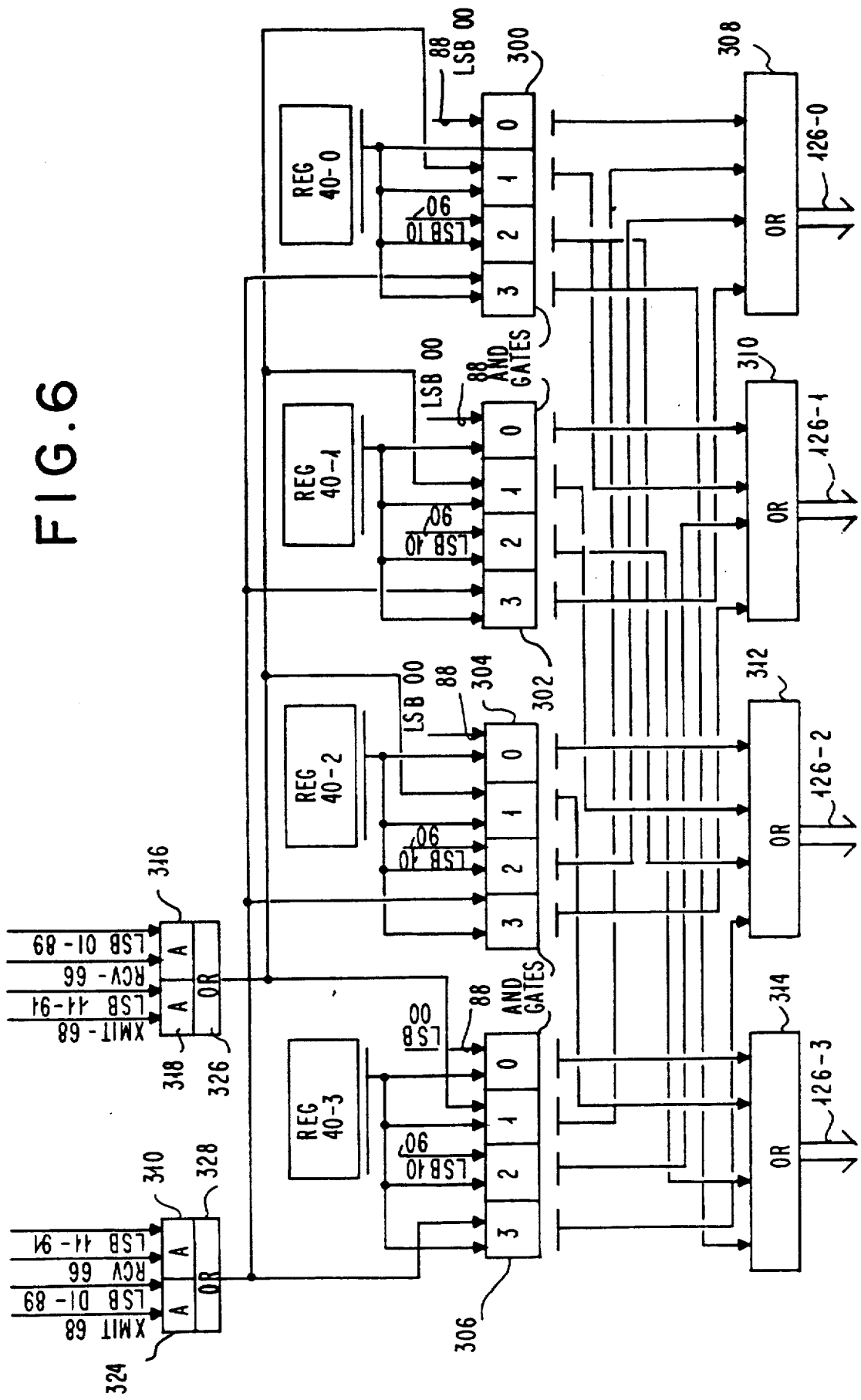
FIG. 6 shows the alignment logic 43.

The logic arrangement which may be used to implement alignment logic 43 will now be described in reference to FIG. 6.

The contents of registers 40-0 to 40-3 are provided to AND gate assemblies 300, 302, 304 and 306 to be gated to buses 126-0 to 126-3 through OR gate assemblies 308, 310, 312 and 314. As explained in reference to FIGS. 3 and 4, the gating of the register contents on busses 126-0 to 126-3 depends upon the LSB bit values. Thus, each AND gate assembly 300, 302, 304 and 306 comprises four sets (which are numbered 0, 1, 2, 3 in FIG. 6) of eight AND gates (one gate for each stage of the registers).

The four sets of AND gates are conditioned by one of the LSB lines 88 to 91. Gates 300-0, 302-0, 304-0 and 306-0 are conditioned by LSB 00 line 88 to provide the contents of registers 40-0, 40-1, 40-2 and 40-3 to buses 126-0, 126-1, 126-2 and 126-3.

In receive mode, gates 300-1, 302-1, 304-1 and 306-1 are conditioned by LSB01 line 89 and in transmit mode, they are conditioned by LSB11 line 91, to provide the contents of registers 40-0, 40-1, 40-2 and 40-3 to buses 126-1, 126-2, 126-3 and 126-0, respectively. This is performed by AND gates 316 and 318 and by OR gate 326. LSB01 line 89 and LSB11 line 91 are connected to one input of AND gates 316 and 318 which are conditioned by the RECEIVE signal on line 66 and by the TRANSMIT signal on line 68. The output lines of these AND gates are connected to the inputs of OR gate 326, which provides the conditioning signal to gates 300-1, 302-1, 304-1 and 306-1.

Gates 300-2, 302-2, 304-2 and 306-2 are conditioned by LSB10 line 90, to provide the contents of registers 40-0, 40-1, 40-2 and 40-3 to busses 126-2, 126-3, 126-0 and 126-1, respectively.

In receive mode, gates 300-3, 302-3, 304-3 and 306-3 are conditioned by LSB11 line 91 and in transmit mode, they are conditioned by LSB01 line 89 to provide the contents of registers 40-0, 40-1, 40-2 and 40-3 to busses 126-3, 126-0, 126-1 and 126-2, respectively. This is performed by AND gates 316 and 318 and by OR gate 326. LSB01 line 89 and LSB11 line 91 are connected to one input of AND gates 316 and 318 which are conditioned by the RECEIVE signal on line 66 and by the TRANSMIT signal on line 68. The output lines of these AND gates are connected to the inputs of OR gate 326, which provides the conditioning signal to gates 300-1, 302-1, 304-1 and 306-1.

Figure 7:
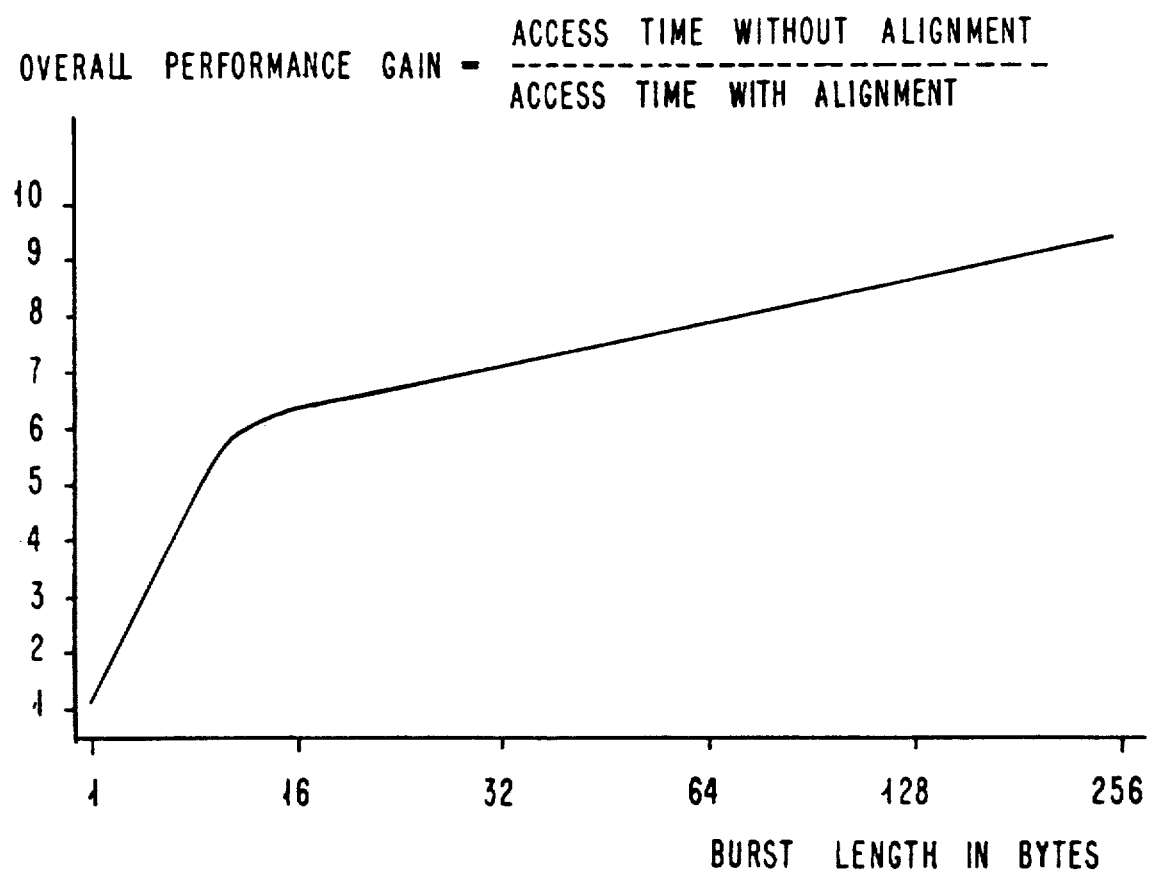
FIG. 7 shows the diagram of the performance gain as a function of the data burst length.

The diagram of FIG. 7 shows the performance gain which is may be expressed by the ratio of the memory access time without alignment and the memory access time with alignment, versus the burst length expressed in bytes, in case of a dynamic memory provided with a page mode of operation.

The performance improvement increases with the burst size, but is already significant for a burst size equal to six bytes.

The present invention has been described in detail, assuming that the data bus is two bytes wide and the memory is organized in four-byte words, but a person skilled in the art could easily make modifications in the detailed implementation to build a memory format adapter which works with any data bus format and memory provided that said memory be organized in $2^n$ byte words, and that $2^n/m$ is an integer number.

We claim:

1. Memory access control device to be used to access a memory organized in $2^n$ byte words and having the capability of addressing each byte in a word under control of byte select signals (BS), through a m-byte wide data bus, with $2^n/m$ being an integer k, where k is higher than 1, to write data byte bursts comprising a variable count of bytes, characterized in that it comprises:

clocking means (60, 70, 76) which provide a number equal to said integer k of non-overlapping pulse streams (T1, T2) having the same period T; and memory format adapting means comprising:

$2^n$ gating means making up a number equal to said integer k of sets of gating means, each set being responsive to one of said k non-overlapping pulse streams, each gating means of each set being connected so as to receive a data byte from said data bus to provide it on its output when activated by the pulse stream;

$2^n$ register means (40), each register means being connected to the output of a gating means in such a way that at the end of a T period, $2^n$ bytes are stored in the register means, buffering means (30) comprising successive locations of $2^n$ positions, each position being able to store one byte under control of a write select signal, alignment and control means (42) which are active for a memory write operation and are responsive to the values of n least significant bits of the starting memory address which determine the byte location within the memory words, to the byte count and to the non-overlapping pulse streams to selectively activate the write select signals relative to each buffer byte position and to write the register means contents in parallel in the selected positions of successive buffer locations in such a way that the buffer content maps the arrangement of the data burst which is to be written into the memory; and end of loading detecting means responsive to the count of bytes in the burst and to one pulse stream among the k pulse streams to generate an end of loading signal indicative that the burst is loaded into the buffering means; and memory writing control means (192,168) responsive to the end of loading signal to selectively activate the byte select signals (BS) as a function of the least significant bits of the starting memory address so as to transfer the buffer content to the memory from the byte location in the first word defined by the starting memory address.

2. Memory access control device according to claim 1, characterized in that the memory format adapting means comprises:

memory reading control means for sending a data byte burst stored in the memory from a starting memory address to the data bus, said memory reading control means further comprising:

buffer writing means (190,216,148) which are active to cause the data byte burst read from the memory to be written into the successive locations of the data buffering means in such a way that the data buffer content maps the content of the memory portion where the data burst was stored, buffer reading means (148,220,236) which are responsive to the end of loading signal to read each buffer location, to provide the bytes read from the buffering means on buffer output buses (234 0-3);

register selection means (236) which are responsive to the values of the least significant bits of the memory starting address which determine the byte location within the memory words, to the byte count and to the non overlapping pulse streams to generate register select signals (RS);

gating means (246) which are responsive to the register select signals to provide the bytes from the buffer output buses to selected ones of the registers means; and data bus control means (43,250,252) responsive to the least significant bit values and to the non overlapping pulse streams, to provide the register means content to the data bus sequentially, in the right order.

3. Memory access control device according to claim 1 or claim 2 characterized in that the alignment and control means comprise:

2" buffer input buses (126 0-3) which provide the data bytes to be written into the buffering means, alignment logic (43) which are responsive, for a memory write operation to the least significant bits of the starting memory address to provide the register means content to selected buffer input buses by means of driving means (128) which are activated during the transfer of the data burst into the buffering means, data bus cycle number determining means (98,92) which are activated at the start of a bus transfer, for a memory write operation, and which are responsive to the least significant bits of the starting memory address and to the byte count to determine the number of periods T which are needed to transfer the data burst from the data bus to the buffering means, said number being then decremented during each period T so as to provide a start of memory transfer signal when said number becomes equal to zero; and write select control means (140,148) which are responsive to the start memory transfer signal and which are responsive to the least significant bits of the memory starting address and to the non overlapping pulses streams to activate the write select signals (WS) and cause the data bytes from the buffer input buses to be written into selected positions of the successive buffer locations.

4. Memory access control device according to claim 3 characterized in that the memory writing control means comprise:

memory transfer number determining means (182,184) which are responsive to the byte count and to the least significant bits of the starting memory address to determine the number of memory operations which are needed for a memory write operation to store the data burst into the memory, said number being then decremented each time a memory word is written, to provide a last memory transfer signal when said number becomes equal to zero; and byte select control means (168) which are activated when the start memory transfer signal becomes active until the last memory transfer signal becomes active to activate the memory byte select signals during the first and last memory transfers as a function of the least significant bits of the starting memory address and all the byte select signals during the intermediate transfers, to control the writing of the buffering means content into the memory.

5. Memory address control device according to claim 4 characterized in that:

in the memory reading control means, the buffer writing means further comprises:

buffer input means (216) which are active to provide the data bytes read from the memory to the buffer input buses: and memory transfer number determining means (182,184) which are responsive to the byte count and to the least significant bits of the starting memory address to determine the number of memory transfers which are needed to transfer the data burst from the memory to the buffering means, said number being then decremented each time a buffering means location is written, to provide a start of bus transfer signal when said number becomes equal to zero.

6. Memory access control device according to claim 5, characterized in that:

in the memory reading control means, the register selection means comprise data bus cycle number determining means (92, 98) which are activated at the start of the memory reading operation and are responsive to the least significant bits of the memory starting address and to the byte count to determine the number of periods T which are needed to transfer the data burst from the buffering means to the bus, said number being then decremented during each T period so as to provide and end of bus transfer signal when said number becomes equal to zero.

7. Memory access control device according to claim 6, characterized in that:

in the memory reading control means, the data bus control means makes use of the alignment logic (43) of the alignment and control means and further comprises gating means which are responsive to the non overlapping pulses streams and to the least significant bits of the starting memory address, to provide m bytes to the data bus in the right order, until the end of bus transfer signal becomes active.

8. Memory access control device according to claim 7 characterized in that n and m are equal to 2 and the four write select signals WS0 to WS3, which control the writing into the four byte positions 0 to 3, are generated by the write select control logic means (140) according to the logical equations:

$$WS0 = WS1 = T1.(LSB00 + LSB01) + T2.(LSB10 + LSB11)$$
$$= WS2 = T1.(LSB01 + LSB10) + T2.(LSB00 + LSB11)$$
$$= WS3 = T1.(LSB10 + LSB11) + T2.(LSB00 + LSB01)$$

where T1 and T2 represent the two non overlapping pulse streams, and LSB00, LSB01, LSB10, LSB11 represent the least significant bits of the starting memory address.

9. Memory access control device according to claim 8 characterized in that the byte select control means generates the four memory byte select signals BS0 to BS3 according to the logical equations:

during the first transfer $$BS0 = LSB00.F$$

$$BS1 = ((LSB00.BC<2) + (LSB10 - LSB11)).F$$

$$BS2 = ((LSB00.BC<3) + (LSB01.BC<2) - LSB11).F$$

$$BS3 = ((LSB00.BC<4) + (LSB01.BC<3) - (LSB10.BC<2)).F$$

where F is equal to 1 during the first memory transfer and BC represents the byte count, and during the last transfer:

BS0 always active $$BS1 = ((LSB00.X1.X0) + (LSB01.X1.X0) + LSB10.X1.X0) + (LSB11.X1.X0)).L$$

$$BS2 = ((LSB00.X1+X0) + (LSB01.X1) + LSB10.(X1+X0) + (LSB.11.X1)).L$$

$$BS3 = ((LSB00.X0.X1) - (LSB01.X0.X1) - (LSB10.X0.X1) + LSB11X0.X1)).L$$

where L is equal to 1 during the last transfert, and X0 and X1 are the two least significant bits of the byte count and where + means Exclusive OR.

10. Memory access control device according to claim 9 characterized in that the register selection means generate the four register select signals RS0 to RS3 according to the logical equations:

$$RS0 = T1.LSB00 - T2.(LSB01 + LSB10 - LSB11)$$

$$RS1 = T1.(LSB00 + LSB01) + T2.(LSB10 + LSB11)$$

$$RS2 = T1.(LSB00 + LSB01 - LSB10) - T2.LSB11$$

$$RS3 = T1.(LSB00 + LSB01 - LSB10 - LSB11).$$

* * * * *